US012620078B2

(12) United States Patent  
Platz

(10) Patent No.: US 12,620,078 B2  
(45) Date of Patent: \*May 5, 2026

(54) METHOD FOR THE AUTOMATED SUPPORT OF AN INSPECTION AND/OR CONDITION MONITORING OF OBJECTS OF A PRODUCTION SYSTEM

(71) Applicant: Siemens Aktiengesellschaft, Munich (DE)

(72) Inventor: Axel Platz, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 250 days.

This patent is subject to a terminal disclaimer.

(21) Appl. No.: 18/267,838

(22) PCT Filed: Dec. 15, 2021

(86) PCT No.: PCT/EP2021/085904  
§ 371 (c)(1),  
(2) Date: Jun. 16, 2023

(87) PCT Pub. No.: WO2022/136053  
PCT Pub. Date: Jun. 30, 2022

(65) Prior Publication Data

US 2024/0070839 A1   Feb. 29, 2024

(30) Foreign Application Priority Data

Dec. 21, 2020   (DE) .................... 10 2020 216 400.2

(51) Int. Cl.  
*G06T 7/00*       (2017.01)  
*G06T 7/70*       (2017.01)  
(Continued)

(52) U.S. Cl.  
CPC .............. *G06T 7/0004* (2013.01); *G06T 7/70* (2017.01); *G06T 13/20* (2013.01); *G06T 19/20* (2013.01);  
(Continued)

(58) Field of Classification Search  
None  
See application file for complete search history.

(56) References Cited

U.S. PATENT DOCUMENTS

| | | | |
|---|---|---|---|
| 5,095,365 A | 3/1992 | Takatoo et al. | |
| 7,882,394 B2 | 2/2011 | Hosek et al. | |

(Continued)

FOREIGN PATENT DOCUMENTS

| | | | |
|---|---|---|---|
| DE | 4033303 A1 | 4/1991 | |
| DE | 4115793 A1 | 11/1992 | |

(Continued)

OTHER PUBLICATIONS

Harrison et al: "Kineticons using iconographic motion in graphical user interface design"; Computer Architecture (ISCA), 2011 38th Annual International Symposium on, IEEE, 2 Penn Plaza, Suite 701 New York NY 10121-0701 USA; 7. Mai 2011 (May 7, 2011), pp. 1999-2008, XP058598946.

(Continued)

*Primary Examiner* — Jeffrey J Chow  
(74) *Attorney, Agent, or Firm* — Schmeiser, Olsen & Watts, LLP

(57) ABSTRACT

A method for the automated support of an inspection and/or condition monitoring of objects of a production system is provided. A processor takes or calculates an actual pose of an object. The actual pose specifies a translation and/or rotation with respect to a target pose of the object. A processor calculates a scaled pose of the object from the actual pose of the object by scaling the translation and/or (Continued)

rotation with respect to the target pose of the object. The processor displays an animated focus graphic. The focus graphic displays alternately a graphical image of the object in the target pose and a graphical image of the object in the scaled pose, and the scaling is selected such that a deviation of the actual pose from the target pose, which deviation is diagnostically relevant for the inspection and/or condition monitoring of the object, is clearly perceptible.

24 Claims, 6 Drawing Sheets

(51) Int. Cl.
  *G06T 13/20*    (2011.01)
  *G06T 19/20*    (2011.01)

(52) U.S. Cl.
  CPC ................... *G06T 2200/24* (2013.01); *G06T 2207/10024* (2013.01); *G06T 2207/20092* (2013.01); *G06T 2207/30164* (2013.01); *G06T 2219/2012* (2013.01); *G06T 2219/2016* (2013.01)

(56) References Cited

U.S. PATENT DOCUMENTS

| | | | |
|---|---|---|---|
| 7,973,794 | B2 | 7/2011 | Forney et al. |
| 2015/0022638 | A1* | 1/2015 | Saeki ................... G06T 7/0004 |
| | | | 348/46 |
| 2017/0024613 | A1 | 1/2017 | Shivaram et al. |
| 2019/0287233 | A1 | 9/2019 | Moteki et al. |
| 2020/0184617 | A1* | 6/2020 | Perron ..................... G06T 7/38 |
| 2021/0209740 | A1* | 7/2021 | Kamada ................. G06T 7/001 |
| 2022/0084188 | A1* | 3/2022 | Onishi .................. G06T 7/0004 |
| 2023/0162348 | A1* | 5/2023 | Moteki ................... G06T 19/20 |
| | | | 345/419 |

FOREIGN PATENT DOCUMENTS

| | | |
|---|---|---|
| DE | 4042511 C2 | 1/2001 |
| JP | 2019158628 A | 9/2019 |
| KR | 20160107128 A | 9/2016 |

OTHER PUBLICATIONS

PCT International Search Report of International Searching Authority mailed Apr. 4, 2022 corresponding to PCT International Application No. PCT/EP2021/085904 filed on Dec. 15, 2021.

\* cited by examiner

METHOD FOR THE AUTOMATED SUPPORT OF AN INSPECTION AND/OR CONDITION MONITORING OF OBJECTS OF A PRODUCTION SYSTEM

CROSS-REFERENCE TO RELATED APPLICATIONS

This application claims priority to PCT Application No. PCT/EP2021/085904, having a filing date of Dec. 15, 2021, which claims priority to DE Application No. 10 2020 216 400.2, having a filing date of Dec. 21, 2020, the entire contents all of which are hereby incorporated by reference.

FIELD OF TECHNOLOGY

The following relates to a method for the automated support of an inspection and/or condition monitoring of objects of a production system.

BACKGROUND

In automobile manufacture, bodies are transported in fully automatic conveying systems. After body construction, they pass in this case through a painting system before they are supplied to the final assembly line.

The fully automatic conveying systems, for example in an assembly line, use assembly supports, to which the body is fixed as an object for assembly. The assembly supports are generally referred to as holders below and the objects for assembly are generally referred to as workpieces.

In addition to automobile manufacture and assembly processes in the stricter sense, embodiments of the invention generally relate to production systems which transport workpieces in fully automatic conveying systems by holders, and to the inspection of these holders in order to determine and assess their actual condition. In addition, embodiments of the invention also relate to production systems in which the position or orientation of objects, for example drive shafts, is generally important in other contexts for an inspection or condition monitoring of the objects.

The position and orientation of an object are combined below under the term "pose". DIN EN ISO 8373 defines the term "pose" as a combination of the position and orientation of an object in three-dimensional space, which is predefined as the base coordinate system. The position of the object may be stated, for example, in three coordinates as the distance between its mass point and the origin of the base coordinate system. The orientation of the object may be described, for example, by virtue of a further coordinate system being spanned at its mass point, for the coordinate axes of which coordinate system an angular offset with respect to the respective axes of the base coordinate system is respectively indicated by three angle specifications. Different poses can be mapped to one another by translation and rotation.

According to DIN EN 13306 and DIN 31051, maintenance denotes a combination of measures which are used to obtain or restore a functional condition of an object. One of these measures is inspection, which is used to determine and assess the actual condition of the object and to determine possible causes of impairments. The result of the inspection may involve identifying repair measures for the object, which are subsequently carried out. In this case, the term "object" denotes, for example, a component, a part, a device or a subsystem, a functional unit, an item of equipment or a system, which can be considered alone.

During condition monitoring, machine conditions are regularly or permanently captured by measuring and analyzing physical variables. For this purpose, sensor data are processed and analyzed, in particular, in real time. Monitoring the machine's condition enables condition-oriented maintenance.

Both functional failures of objects such as holders in production systems and their repair and preventative inspection and maintenance work are associated with high costs in manufacturing since they can result in a downtime of the respective manufacturing section.

SUMMARY

An aspect relates to automatically assisting with an inspection and/or condition monitoring of objects of a production system.

The embodiments described can be implemented for the focus graphic, the first graphics, the second graphics and the third graphics on three axes or only for the focus graphic, the first graphics and the second graphics on two axes.

The advantages mentioned below need not necessarily be achieved by the subjects of the independent patent claims. Rather, they may also be advantages which are achieved only by individual embodiments, variants or developments. The same applies to the explanations below.

A user-centered approach for automatically assisting with an inspection or condition monitoring in a production system is provided, which approach provides a visualization of sensor data by a special visualization concept which allows deviations in the sensor data to intuitively stand out. Since the data were previously available only as tables and columns of numbers, this means significant simplification, an increase in efficiency and a qualitative improvement for the maintenance engineer.

Instead of only visualizing when limit values are exceeded, as previously, the present user-centered approach makes it possible to visually capture the type of deviation that is present. The maintenance engineer can infer possible causes from the type of deviation that is present.

The differences stand out by alternately displaying standardization and deviation. At the same time, it is possible to capture at a glance whether this is a displacement and/or rotation and what type it is.

One possible embodiment visualizes, in a combined pictorial and abstract representation, errors such as rotation and deviation of a vehicle body in a suspension means, wherein the display changes back and forth between the target pose and the scaled pose.

BRIEF DESCRIPTION

Some of the embodiments will be described in detail, with reference to the following figures, wherein like designations denote like members, wherein:

FIG. 1 shows an object O, which is connected to a secondary object SO, in a target pose 1 and a scaled pose 2;

FIG. 2 shows a focus graphic 333 which alternately shows the object O shown in FIG. 1 in the target pose 1 and the scaled pose 2;

DETAILED DESCRIPTION

Figure 1:
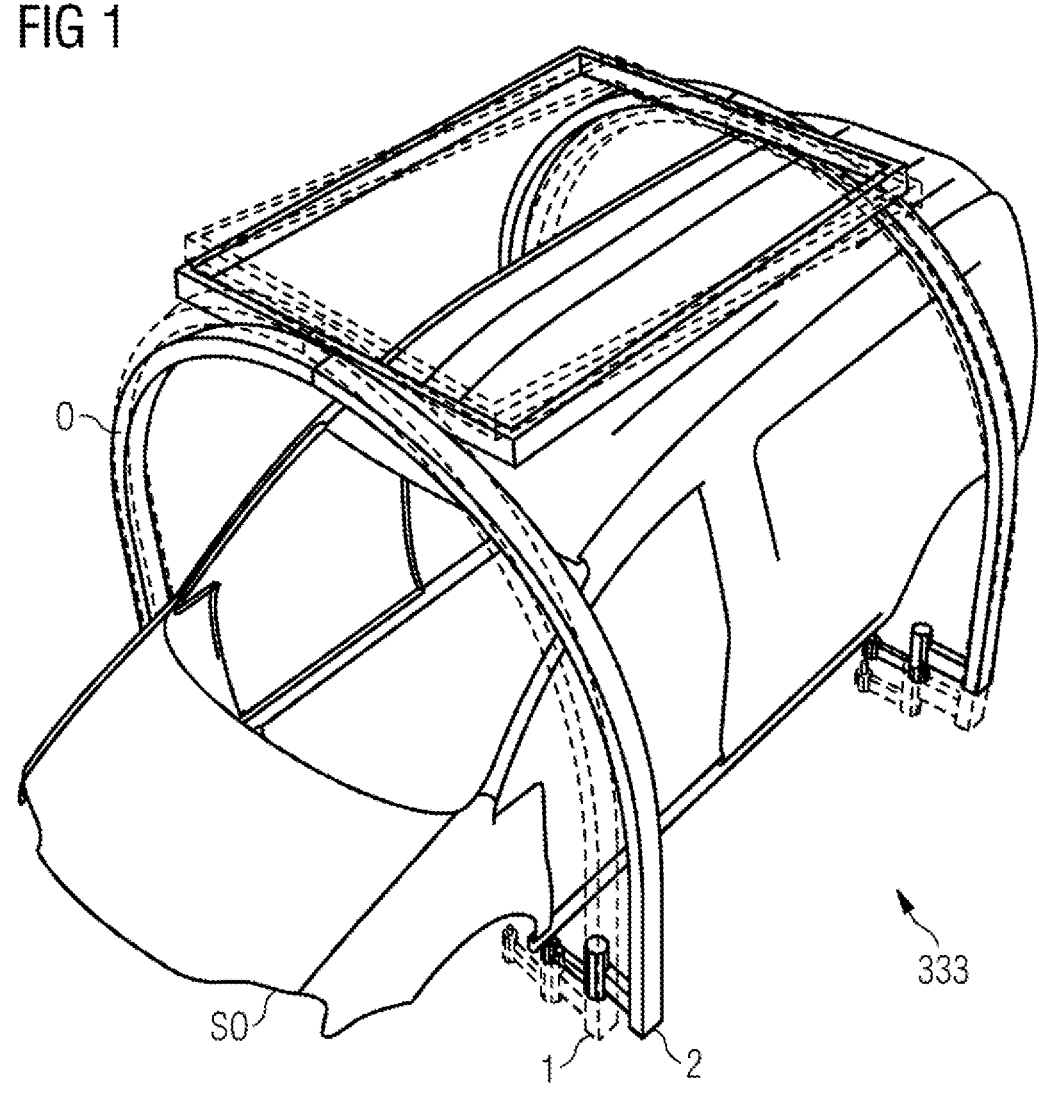

FIG. 1 shows an object O, which is connected to a secondary object SO, in a target pose 1 and a scaled pose 2. The object O shown here is a holder with a workpiece as a secondary object SO. Specifically, the object O depicted is a suspension means which carries a body as a secondary object SO. Depending on the application, the workpiece itself may also be selected as the object O or the entire unit comprising the holder and workpiece can be considered to be the object O. Furthermore, the object O may also be of an entirely different type, for example a drive shaft.

The target pose 1 is, for example, a normalized pose which is expected and presupposed for the object O by a manufacturing station, to which the object O is supplied. In this case, the target pose 1 can be predefined, for example, by a design of the manufacturing station or can be measured in advance.

The intention is now to assist an engineer with carrying out an inspection and/or condition monitoring for the object. A focus graphic 333 shows the type and extent of a translation and/or rotation of the object O with respect to the target pose 1 to the engineer on the display.

For this purpose, an actual pose of the object O in the manufacturing station, which indicates the translation and/or rotation of the object with respect to the target pose 1, is first of all determined by sensors. Such sensors are often already installed in modern manufacturing stations since they enable fine adjustment of industrial robots. Camera-based systems in robot cells, which are passed through as manufacturing stations during automobile manufacture, thus measure the position and orientation of the object O in each robot cell in a fully automatic manner. It goes without saying that laser scanners, ultrasonic sensors, radar sensors or lidar sensors can also be used. All of the sensor types mentioned provide measured values, from which the actual pose of the object O can be directly gathered or at least calculated. For this purpose, the measured values are stored as raw values or, after suitable processing, initially as sensor data in a focus data record. Such data capture in the production system takes place continuously in the background in modern industrial cloud applications, with the result that the corresponding data records only have to be retrieved from the industrial cloud for evaluation. It is also possible here to continuously update the focus data record or other data records on the basis of new measurements during ongoing operation, which updating in turn updates the focus graphic. If appropriate, such updates may even be carried out in real time.

So that the type and extent of the deviation of the actual pose from the target pose 1 can be clearly seen on the display, the actual pose itself is not visualized by the focus graphic 333. This is because the actual deviation may only be a few millimeters or may be a very small angular deviation. Such a deviation would not be able to be seen in the focus graphic 333 if represented in a manner true to scale, but may be diagnostically very important during the inspection and/or condition monitoring. Therefore, a scaled pose 2 is calculated from the actual pose by virtue of the processor scaling the translation and/or rotation with respect to the target pose 1, for example by a factor of between 10 and 200, which is selected depending on the application. The focus graphic now alternately shows a graphical representation of the object O in the target pose 1 and a graphical representation of the object O in the scaled pose 2.

Figure 2:
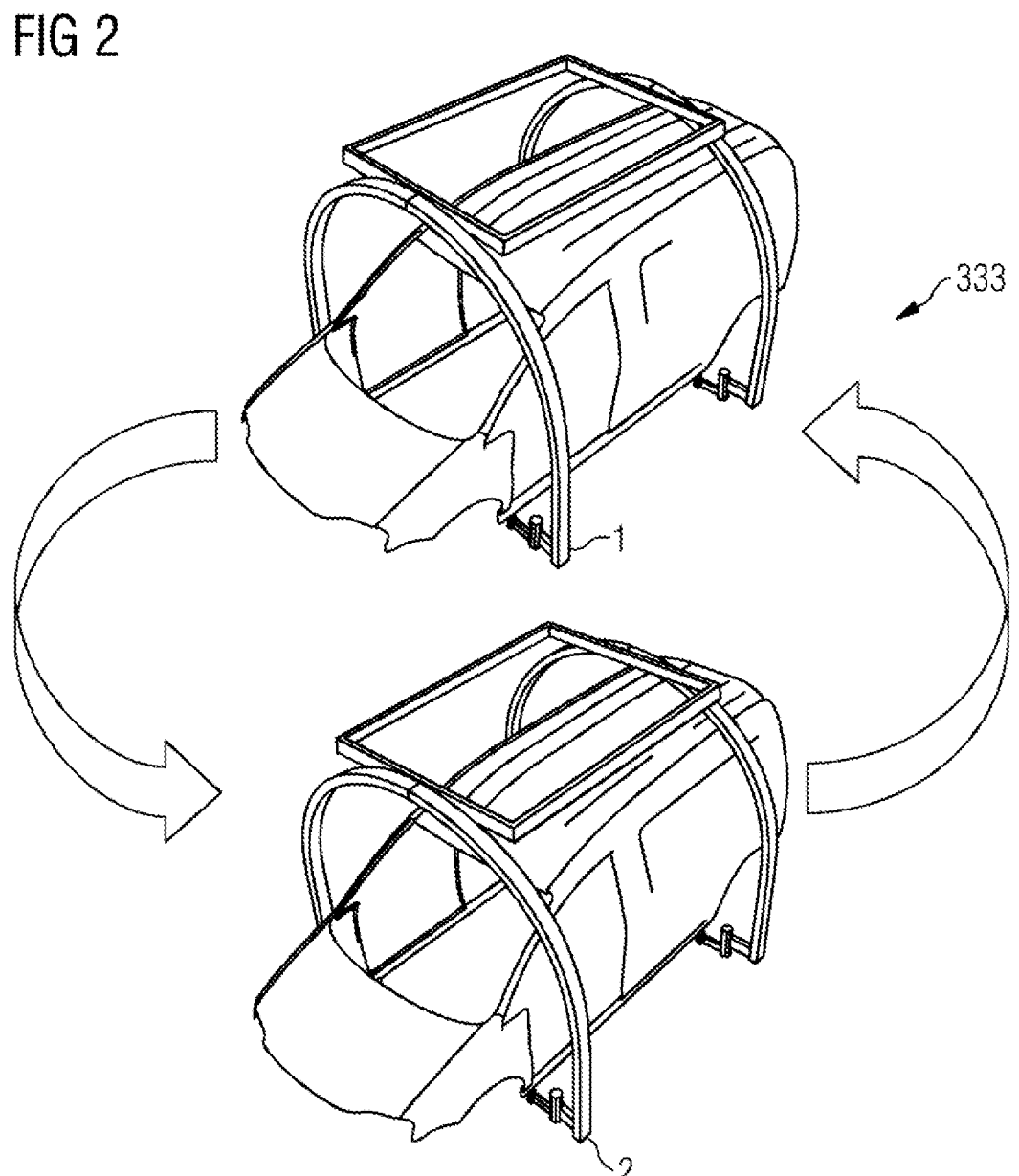

FIG. 2 shows a schematic illustration of the corresponding animation of the focus graphic 333.

The object O shown in FIG. 1 is alternately shown in the target pose 1 and the scaled pose 2. The two representations are superimposed, as depicted in FIG. 1, or displayed in alternation, with the result that the type and extent of the translation and rotation become immediately clear. The object O moves continuously back and forth between the target pose 1 and the scaled pose 2 in an animation, wherein the movement from one pose to the other lasts between 0.4 and 1.7 seconds, in particular between 0.8 and 0.9 seconds. The secondary object SO, shown in FIG. 1 as a body, can be concomitantly moved in this case.

It is particularly advantageous if the animation increasingly colors the object O during the movement to the scaled pose 2 on the basis of the extent of the translation and/or rotation. The object O—or additionally the secondary object SO as well—can thus be provided with a red color on one side during a rotation or translation as if it were to come dangerously close to a red light source in analogy to a fire. In this case, the opposite side may be provided with a blue color. This effect may also in turn be scaled, that is to say exaggerated. A large deviation of the actual pose from the target pose 1 is therefore already immediately discernible on the basis of the change in the color and color intensity of the focus graphic 333, thus considerably simplifying the comparison with other situations.

Figure 3:
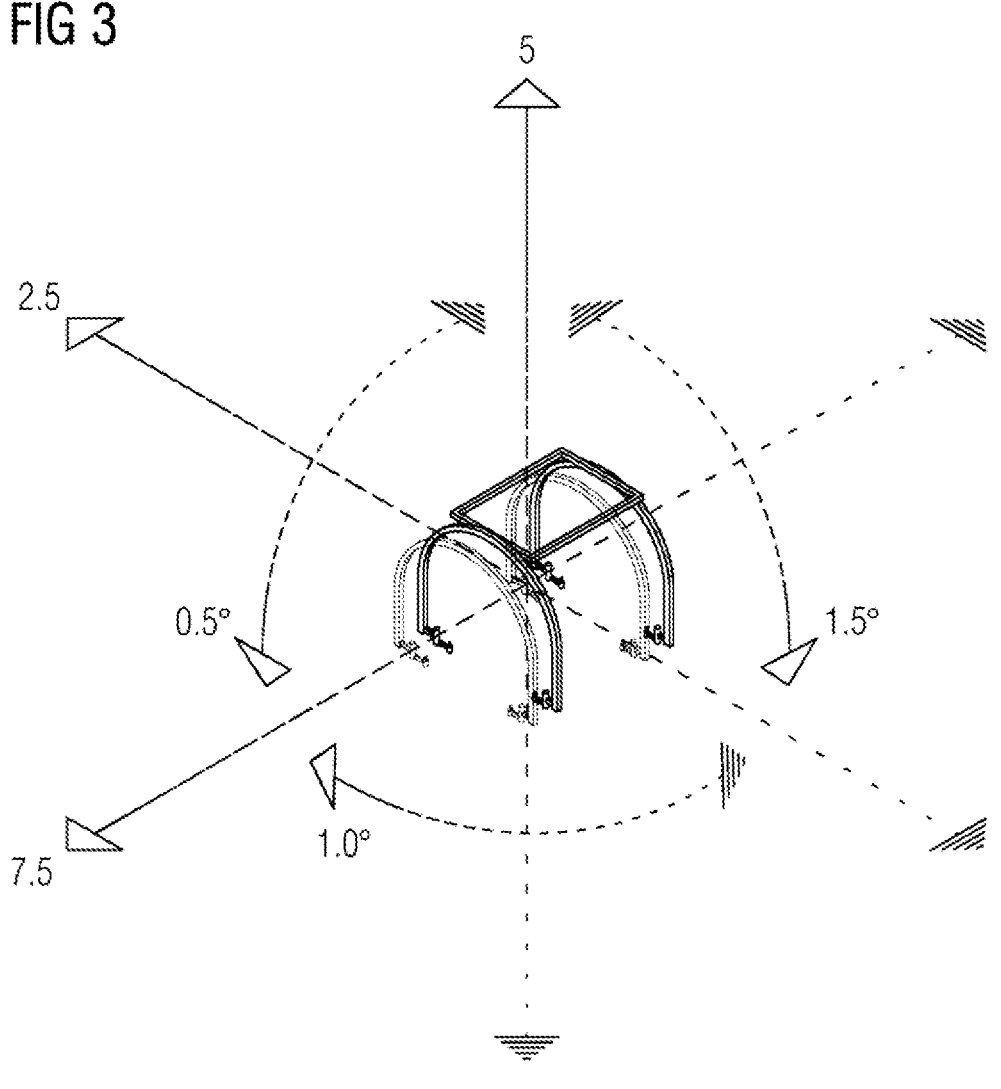
FIG. 3 shows another example of a focus graphic.

FIG. 3 shows another example of a focus graphic. The latter contains a display of deviations and corresponding values based on the three spatial axes, with respect to translation and rotation in each case. The graphics in the present exemplary embodiments can be augmented with arrows and numbers, as shown in FIG. 3.

All of the previously explained calculation and visualization possibilities for the focus graphic 333 apply in the same manner to the other graphics which are introduced below.

The prerequisite for the following exemplary embodiments is first of all a database which contains a set of data records also containing the focus data record explained above, wherein each data record from the set of data records contains, for a respective object from a set of objects in the production system, sensor data, which contain measured values of measurements by sensors on the respective object and/or data derived therefrom, and a first item of context information, a second item of context information and a third item of context information which characterize the respective object itself or a situation of the respective object at the time of the measurements on the respective object.

It goes without saying that the data records may also contain yet further context information. Furthermore, the data records and the database need not be present separately. It is completely sufficient if the data records are available as logical units, that is to say if the data associated with a respective data record can be immediately retrieved. The industrial cloud itself that was explained above may then also be considered to be the database itself, for example. Naturally, however, separate data records may also be held in a local database.

The set of data records is formed, for example, by storing, for each object, once or repeatedly, the sensor data after the respective measurements together with the first context information, the second context information and the third context information in a new data record. The data records can be updated continuously on the basis of new measurements by the sensors, as a result of which the graphics described in more detail below can also be updated continuously. This can also be carried out in real time.

For example, the first context information, the second context information and the third context information each mention a time of the measurements, or a location at which the measurements are carried out, in particular a manufacturing station such as a robot cell, or a type or serial number of the object, for example a suspension means number 81, or a type or serial number of a secondary object which was related to the object and, in particular, was mechanically connected to the object and/or acted on the object at the time of the measurements, for example a body of the four-door sedan type with a hatchback, or a type or serial number of one of the sensors.

Figures 4, 5:
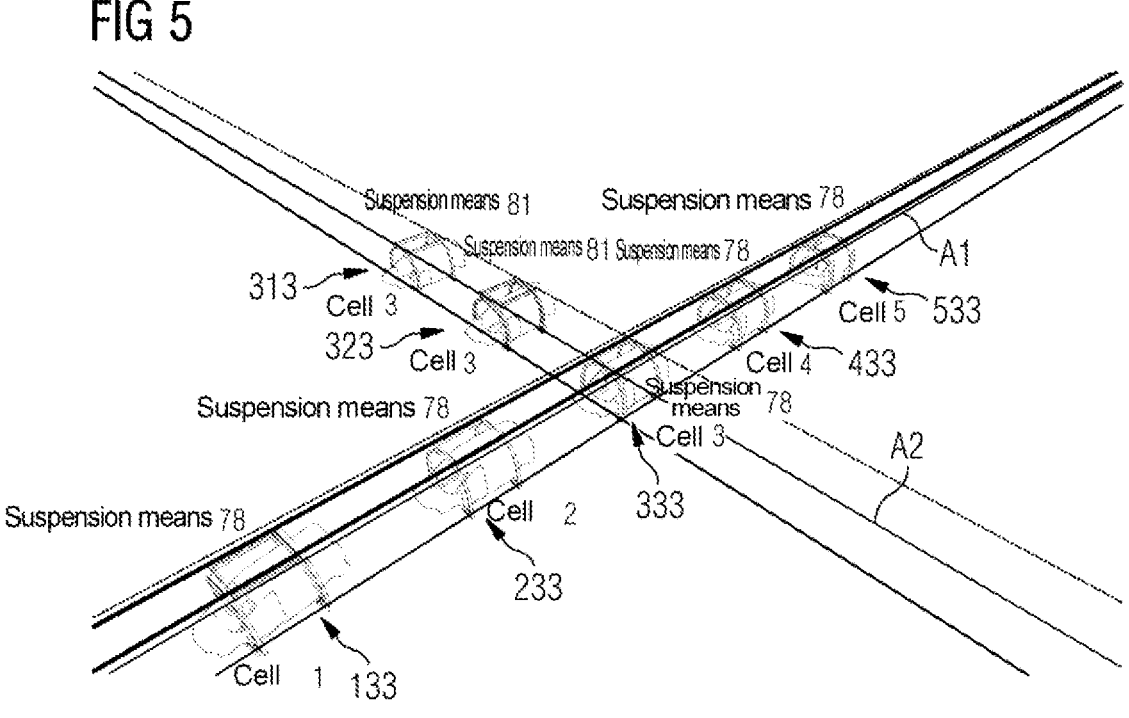
FIG. 4 shows first graphics 133, 233, 433, 533 which, in addition to the focus graphic 333, are lined up on a first axis A1 on a graphical user interface.
FIG. 5 shows second graphics 313, 323 which are lined up on a second axis A2 which intersects the first axis A1 at the position of the focus graphic 333.

FIG. 4 now shows first graphics 133, 233, 433, 533 which are lined up, in addition to the focus graphic 333, on a first axis A1 on a graphical user interface.

For example, during an inspection or condition monitoring of the objects of the production system, which can also be carried out during ongoing operation, an engineer has brought an object into focus, which is represented by the focus graphic 333 in FIG. 4, by an initial user interaction, for example a tapping gesture on a touch display or a mouse click. This object is a suspension means no. 78 which is positioned along a production line in a third robot cell and carries a body of a type A. In addition to the sensor data which are provided from the third robot cell, the corresponding focus data record contains the following context information, for example:

Object number=78

Manufacturing station=3

Body type=A

Time=2020-12-21-23-59-59

In a first user action, the engineer selects from this context information, as first context information, the manufacturing station which thereby becomes a variable which is used for further analysis. For the illustration shown in FIG. 4, first data records are now retrieved from the database, the first context information (manufacturing station) of which data records does not correspond to the first context information of the focus data record, while the other two items of context information (object number and body type) correspond to the focus data record.

For each of the first data records, an actual pose of the respective object, here always the suspension means no. 78, is gathered or calculated from the respective sensor data (here as variables of the respective robot cell). As explained above, an associated scaled pose is calculated. The first graphics 133, 233, 433, 533 then show the suspension means no. 78 on a first axis A1 along guides F in the different robot cells, wherein the first graphics alternately show graphical representations of the suspension means no. 78 in the respective target pose and graphical representations of the suspension means no. 78 in the respective scaled pose, as already explained above for the focus graphic 333. The suspension means no. 78 wobbles to a different extent on the graphical user interface, to the greatest extent in the first graphic 133 depicted on the front left for the first robot cell.

The engineer can now already distinguish the extent to which significant deviations can be attributed to the suspension means no. 78 itself or the respective robot cell.

FIG. 5 shows second graphics 313, 323 which are lined up on a second axis A2 which intersects the first axis A1 at the position of the focus graphic 333.

In this respect, in a second user action, the engineer has initially selected, as second context information, the suspension means itself which thereby becomes a variable which is used for the further analysis. For the illustration shown in FIG. 5, second data records are now retrieved from the database, the second context information (object number) of which data records does not correspond to the first context information of the focus data record, while the other two items of context information (manufacturing station and body type) correspond to the focus data record.

For each of the second data records, an actual pose of the respective object, here as variables of the suspension means no. 36 and no. 81, is gathered or calculated from the respective sensor data of the third robot cell. As explained above, an associated scaled pose is calculated. The second graphics 313, 323 then show the different objects (suspension means) on a second axis A2, wherein the second graphics alternately show a graphical representation of the respective object in the respective target pose and a graphical representation of the respective object in the respective scaled pose, as already explained above for the focus graphic 333.

The second graphics 313, 323 are visually highlighted or displayed normally together with the focus graphic 333, while the first graphics 133, 233 are hidden or grayed out so that the engineer can concentrate on the comparison of the second graphics 313, 323 with the focus graphic 333.

The engineer can now already distinguish the extent to which significant deviations relate only to the suspension means no. 78 itself or other suspension means in the third robot cell.

It goes without saying that the engineer can select any of the graphics shown at any time and can thereby bring them into focus, as a result of which the corresponding data record is selected as the focus data record.

Figure 6:
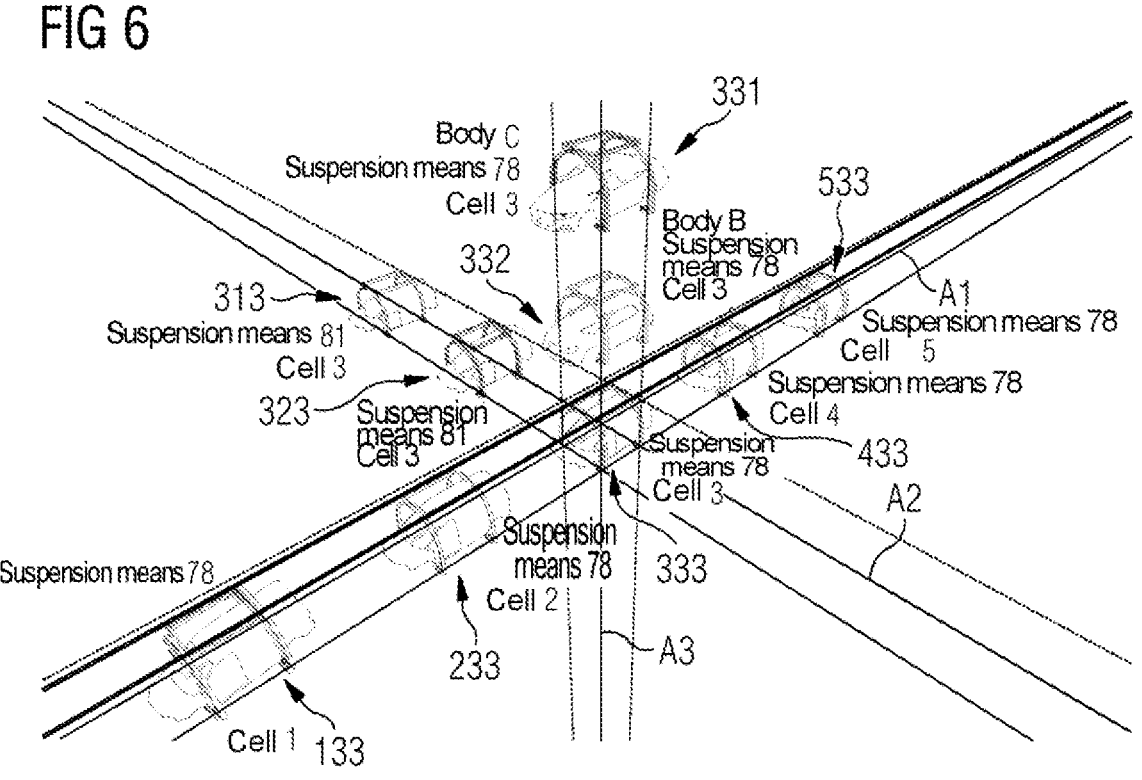
FIG. 6 shows third graphics 331, 332 which are lined up on a third axis A3 which intersects the first axis A1 and the second axis A2 at the position of the focus graphic 333.

FIG. 6 shows third graphics 331, 332 which are lined up on a third axis A3 which intersects the first axis A1 and the second axis A2 at the position of the focus graphic 333.

In this respect, in a third user action, the engineer has initially selected, as third context information, the type of secondary object, here the body, which thereby becomes a variable which is used for further analysis. For the illustration shown in FIG. 6, third data records are now retrieved from the database, the third context information (body type) of which data records does not correspond to the first context information of the focus data record, while the other two items of context information (manufacturing station and object number) correspond to the focus data record.

For each of the third data records, an actual pose of the suspension means no. 78 is gathered or calculated from the respective sensor data of the third robot cell. As explained above, an associated scaled pose is calculated. The third graphics 331, 332 then show the suspension means no. 78 with different secondary objects (the body type B and the body type C) on a third axis A3, wherein the third graphics alternately show a graphical representation of the suspension means no. 78 in the respective target pose and a graphical representation of the suspension means no. 78 in the respective scaled pose, as already explained above for the focus graphic 333. The third graphics 331, 332 are visually highlighted or displayed normally together with the focus graphic 333, while the first graphics 133, 233, 433, 533 and the second graphics 313, 323 are hidden or grayed out so that the engineer can concentrate on the comparison of the third graphics 331, 332 with the focus graphic 333.

The engineer can now distinguish the extent to which significant deviations at the suspension means no. 78 in the third robot cell relate only to a particular body type or to all body types equally. In the situation shown in FIG. 6, the suspension means no. 78 containing the body type C in the upper third graphic 331 noticeably differs greatly from the target pose.

FIG. 6 therefore shows a diagram, in the center of which there is a holder with a workpiece, to be precise in a particular situation, here in a particular manufacturing process step, at a time selected by the engineer as part of the analysis. For this purpose, in the comparison, other holders with identical types of workpieces are shown on the second axis A2 and the same holder with different types of workpieces is shown on the third axis A3, both in the same process step in each case which is carried out in the third robot cell.

In the event of disruptions, for example dimensional deviations, the engineer can see on the graphical user interface whether these disruptions occur only in a particular process step, only in the case of a particular holder or only in the case of a particular type of workpiece, or whether they are repeated in other process steps, holders or workpieces.

The target pose may be identical in each case for different objects, manufacturing stations and secondary objects or may be specific to the respective object, the respective manufacturing station or the respective secondary object. The actual pose is always defined as a deviation from the associated target pose and is therefore diagnostically meaningful.

If more first data records, second data records or third data records are found than can be clearly displayed on the graphical user interface, only a selection is shown. The engineer can filter the respective data records further, if necessary, using suitable operating elements.

The graphics may additionally contain arrows, numbers, labels or other symbols.

The focus graphic 333 is arranged in the center of the first axis A1, the second axis A2 and the third axis A3, wherein the focus graphic 333, the first graphics 133, 233, 433, 533, the second graphics 313, 323 and the third graphics 331, 332 are arranged in an equidistant manner on the respective axis.

The first axis A1, the second axis A2 and the third axis A3 are orthogonal to one another and are represented by a projection onto the graphical user interface. The projection is a central projection, in particular a two vanishing point perspective, or an isometric parallel projection.

The isometric parallel projection has the advantage that it does not comprise any distortion. Therefore, raster graphics generated in advance can be used for the graphics.

Figure 7:
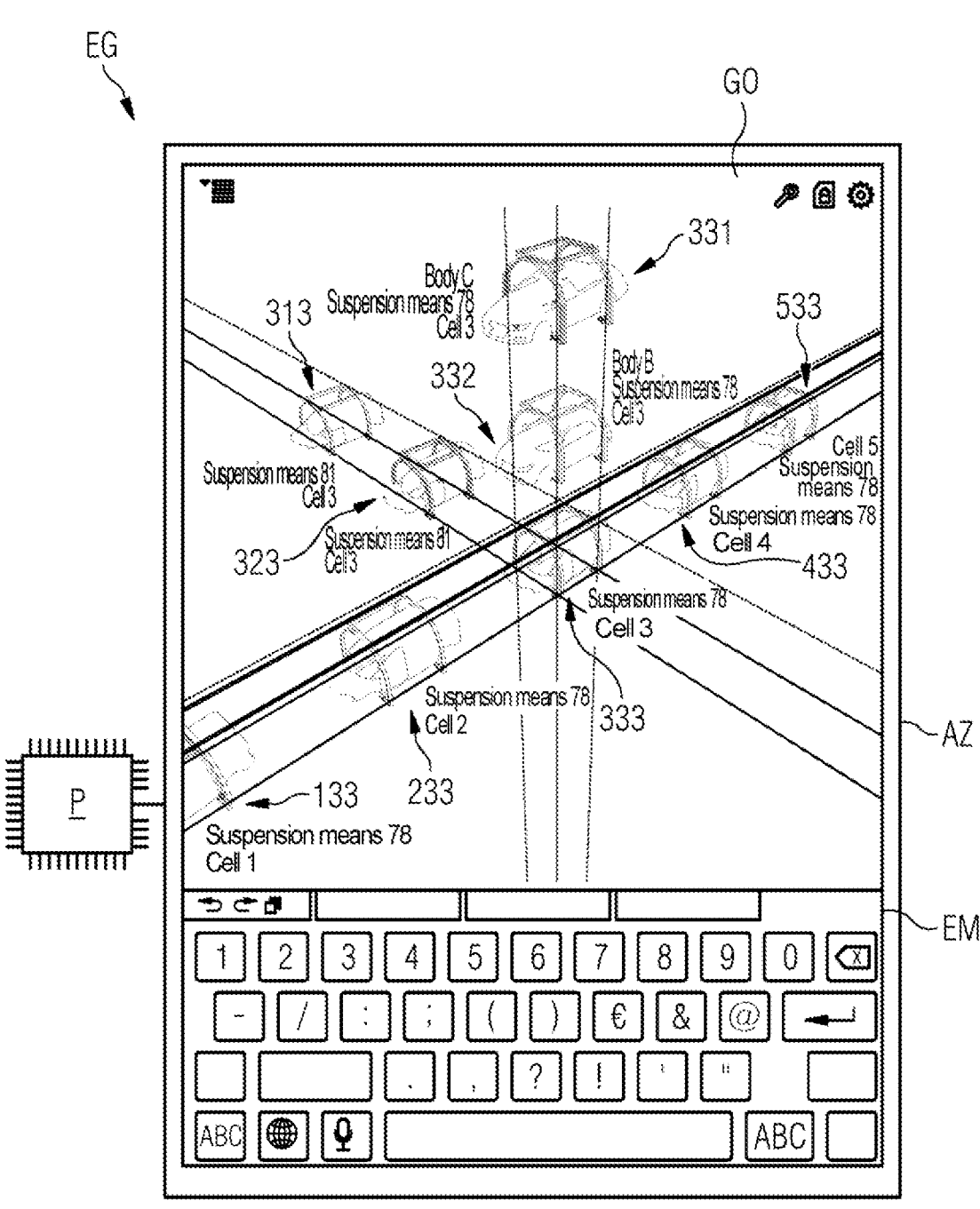
FIG. 7 shows a terminal EG having a processor P, an input means EM and a display AZ which is configured to output a graphical user interface GO.

FIG. 7 shows a terminal EG having a processor P, an input means EM and a display AZ which is configured to output a graphical user interface GO.

The input device EM is, for example, a virtual keyboard on a touchscreen, a mechanical keyboard, a mouse, a trackpad or an apparatus for voice input or gesture control.

The processor P is, for example, a microprocessor or a microcontroller, a system-on-chip or a programmable digital module, for instance a "Field Programmable Gate Array" (FPGA).

The terminal EG is, for example, a notebook, a smartphone, a tablet, AR glasses, VR glasses or a PC.

The display AZ is, for example, a screen or a projector which outputs a two-dimensional image or a three-dimensional image. The three-dimensional image may be output stereoscopically, for example.

The processor P may be arranged in the terminal EG or in a server. It may carry out the method steps explained above on its own, in alternation or in parallel with other processors.

For example, the processor P may be arranged in the terminal and, as the main or graphics processor, can itself render the graphics explained above. For the rendering, the processor P can process code which is written in a Web3D description language, in order to present the graphics in a three-dimensional manner, and is embedded in HTML code which is received from a server. The graphics can be rendered as two-dimensional raster graphics which are optionally stored in the associated data records.

Alternatively, the processor P may be arranged in a server and may render the graphics explained above therein. In this case, the graphics may also be converted into two-dimensional raster graphics which are optionally stored in the associated data records. Furthermore, the rendered graphics can be transmitted to the terminal EG for display, for example by a remote desktop or by an interactive video stream. In this case, the entire graphical user interface GO may also be transmitted from the server to the terminal EG, in particular. The server may also have suitable interfaces for accessing the database. The same applies to the terminal EG if the calculations are carried out in the terminal.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for automatically assisting with an inspection and/or condition monitoring of objects of a production system, said method comprising:
   a processor gathering or calculating an actual pose of an object from sensor data in a focus data record, wherein the sensor data contains measured values of measurements by sensors on the object in the production system and/or data are derived from the measured values, wherein the actual pose of the object indicates a translation and/or rotation with respect to a target pose of the object;
   the processor or a different processor calculating a scaled pose of the object from the actual pose of the object by virtue of the processor scaling the translation and/or rotation with respect to the target pose of the object; and
   the processor or the different processor displaying, on a graphical user interface, a moving focus graphic representing the sensor data of the focus data record, said moving focus graphic alternately showing a first graphical representation of the object in the target pose of the object and a second graphical representation of the object in the scaled pose of the object.

2. The method as claimed in claim 1, wherein the object is a holder which holds a workpiece, or wherein the object is the workpiece which is held by the holder, or wherein the object includes the holder and the workpiece such that the holder holds the workpiece.

3. The method as claimed in claim 2, wherein the holder is a suspension means and/or wherein the workpiece is a body.

4. The method as claimed in claim 1, wherein the sensor data in the focus data record are updated continuously by new measurements, and wherein the actual pose of the object, the scaled pose of the object and the focus graphic are recalculated continuously in real time based on the updated sensor data.

5. The method as claimed in claim 1, wherein the scaling is selected in such a manner that a direction of the translation and/or rotation can be seen by scaling the translation by a factor of between 10 and 200 and/or by scaling the rotation by the factor of between 10 and 200.

6. The method as claimed in claim 1, wherein the focus graphic shows an animation in which the object continuously moves back and forth between the target pose of the object and the scaled pose of the object, wherein the movement from the target pose to the scaled pose occurs in a time duration of between 0.4 and 1.7 seconds or between 0.8 and 0.9 seconds, and wherein the movement from the scaled pose to the target pose occurs in said time duration.

7. The method as claimed in claim 6, wherein the animation increasingly colors the object during the movement to the scaled pose of the object on the basis of an extent of the translation and/or rotation.

8. The method as claimed in claim 1, further comprising:
the processor or a different processor gathering or calculating an actual pose of a comparison object from sensor data in a comparison data record, which contain measured values of measurements by sensors on the comparison object in the production system and/or data derived from the measured values, wherein the actual pose of the comparison object indicates a translation and/or rotation with respect to a target pose of the comparison object;
the processor or the different processor calculating a scaled pose of the comparison object from the actual pose of the comparison object by virtue of the processor scaling the translation and/or rotation with respect to the target pose of the comparison object; and
the processor or the different processor displaying a moving comparison graphic, which represents the sensor data of the comparison data record, beside the focus graphic on the graphical user interface, wherein the comparison graphic alternately shows a third graphical representation of the comparison object in the target pose of the comparison object and a fourth graphical representation of the comparison object in the scaled pose of the comparison object.

9. The method as claimed in claim 1, comprising:
the processor or a different processor accessing a database which contains a set of data records containing the focus data record, wherein each data record from the set of data records contains, for a respective object from a set of objects in the production system, sensor data containing measured values of measurements by sensors on the respective object and/or data derived therefrom, and a first item of context information, a second item of context information and a third item of context information characterizing the respective object itself or a situation of the respective object at the time of the measurements on the respective object,
the processor or the different processor selecting first data records from the set of data records, a first context information of which does not correspond to the first context information of the focus data record, and a second context information of which corresponds to the second context information of the focus data record, the processor or the different processor, for each of the first data records, gathering or calculating an actual pose of the respective object from the respective sensor data, which actual pose indicates a translation and/or rotation with respect to a target pose of the respective object,
calculating a scaled pose of the respective object from the actual pose of the respective object by virtue of the processor scaling the translation and/or rotation with respect to the target pose of the respective object,
the processor or the different processor lines up moving first graphics, which each represent the sensor data of one of the first data records in each case, beside the focus graphic on a first axis on the graphical user interface, wherein the first graphics alternately show third graphical representations of the respective objects in the target poses of the respective objects and fourth graphical representations of the respective objects in the scaled poses of the respective objects,
the processor or the different processor selects second data records from the set of data records, the first context information of which corresponds to the first context information of the focus data record, and the second context information of which does not correspond to the second context information of the focus data record,
the processor or the different processor, for each of the second data records, gathering or calculating an actual pose of the respective object from the respective sensor data, which actual pose indicates a translation and/or rotation with respect to a target pose of the respective object,
calculating a scaled pose of the respective object from the actual pose of the respective object by virtue of the processor scaling the translation and/or rotation with respect to the target pose of the respective object, and
the processor or the different processor lines up moving second graphics, which each represent the sensor data of one of the second data records in each case, on a second axis, which intersects the first axis at the position of the focus graphic, on the graphical user interface, wherein the second graphics alternately show the third graphical representations of the respective objects in the target poses of the respective objects and the fourth graphical representations of the respective objects in the scaled poses of the respective objects.

10. The method as claimed in claim 9, wherein the database is in a memory connected to the processor or is in a cloud, wherein the processor, a different processor or a plurality of other processors receives(s), for each object, once or repeatedly, the sensor data after the respective measurements and store(s) the sensor data for each object together with the first context information, the second context information and third context information in the respective data record, thus forming the set of data records in the database.

11. The method as claimed in either of claim 9, wherein the data records are updated continuously on the basis of new measurements by the sensors, and wherein the focus graphic, the first graphics and/or the second graphics is/are updated continuously in real time in order to represent the updated sensor data.

12. The method as claimed in claim 9,
wherein the first context information, the second context information and the third context information each indicate a time of the measurements, or a manufacturing station at which the measurements are carried out, or a type or serial number of the object, or a type or serial number of a secondary object which was related to the object and, was mechanically connected to the object and/or acted on the object at the time of the measurements, or a type or serial number of one of the sensors.

13. The method as claimed in claim 9, wherein the first data records and the second data records are selected in such a manner that third context information of the first data records and the second data records corresponds to the third context information of the focus data record, the method comprising:

the processor or a different processor selecting third data records from the set of data records, the first context information of which corresponds to the first context information of the focus data record, the second context information of which corresponds to the second context information of the focus data record, and the third context information of which does not correspond to the third context information of the focus data record, the processor or the different processor, for each of the third data records, gathering or calculating an actual pose of the respective object from the respective sensor data, which actual pose indicates a translation and/or rotation with respect to a target pose of the respective object, and calculating scaled pose of the respective object from the actual pose of the respective object by virtue of the processor scaling the translation and/or rotation with respect to the target pose of the respective object, wherein the processor or the different processor lines up moving third graphics, which each represent the sensor data of one of the third data records in each case, on a third axis, which intersects the first axis and the second axis at the position of the focus graphic, on the graphical user interface, wherein the third graphics alternately show the third graphical representations of the respective objects in the target poses of the respective objects and the fourth graphical representations of the respective objects in the scaled poses of the respective objects.

14. The method as claimed in claim 13, wherein the processor or a different processor evaluating an initial user interaction which selects the focus data record from the set of data records, and/or evaluating a first user interaction which selects the first context information from a set of context information stored in the focus data record, and/or evaluating a second user interaction which selects the second context information from the set of context information, and/or evaluating a third user interaction which selects the third context information from the set of context information.

15. The method as claimed in claim 13, different processor renders multiple graphics and then stores the multiple graphics in the respective data records, or retrieves the multiple graphics from the respective data records, or retrieves the multiple graphics from a server which renders the multiple graphics and/or keeps the multiple graphics in a memory, and wherein the multiple graphics comprise the focus graphic, the first graphics, the second graphics and/or the third graphics.

16. The method as claimed in claim 13, wherein the focus graphic, the first graphics, the second graphics and/or the third graphics are three-dimensional graphics and are described by code of a Web3D description language, or are two-dimensional moving raster graphics which appear in a three-dimensional manner.

17. The method as claimed in one of claim 13, wherein the focus graphic, the first graphics, the second graphics and/or the third graphics contain arrows, numbers and/or other symbols.

18. The method as claimed in claim 13, wherein the focus graphics are arranged in the center of the first axis, the second axis and the third axis, and/or wherein the focus graphic, the first graphics, the second graphics and/or the third graphics are arranged in an equidistant manner on the respective axis.

19. The method as claimed in claim 13, wherein the first axis, the second axis and the third axis are orthogonal to one another and are represented by a projection onto the graphical user interface, wherein the projection is a central projection.

20. A terminal for automatically assisting with an inspection and/or condition monitoring of objects, having at least one processor programmed to carry out the method as claimed in claim 1, said terminal having a display configured to output the graphical user interface, and having an interface configured to access the database.

21. A server for automatically assisting with an inspection and/or condition monitoring of objects, having at least one processor programmed to carry out the method as claimed in claim 1, and having one or more interfaces configured to transmit the graphical user interface to a terminal having a display.

22. The server as claimed in claim 21, wherein the processor is programmed to transmit the graphical user interface to the terminal by a remote desktop, or by an interactive video stream, or by HTML code in which code of a Web3D description language is embedded, on the basis of which the focus graphic is rendered on the terminal.

23. The method as claimed in claim 1, wherein the scaling is selected in such a manner that a deviation of the actual pose of the object from the target pose of the object can be seen on the graphical user interface, said deviation being diagnostically relevant to the inspection and/or condition monitoring of the object.

24. A computer program product, comprising a non-transitory computer readable hardware storage device having computer readable program code stored therein, said program code executable by a processor of a computer system to implement a method which carries out the method as claimed in claim 1 when executed in a processor.

* * * * *